(12) United States Patent
Schouten

(10) Patent No.: US 12,292,544 B2
(45) Date of Patent: May 6, 2025

(54) DRIFT TUBE BOREHOLE MUON DETECTOR SYSTEM, APPARATUS, AND METHOD FOR MUON RADIOGRAPHY AND TOMOGRAPHY

(71) Applicant: Ideon Technologies Inc., Richmond (CA)

(72) Inventor: Douglas William Schouten, Surrey (CA)

(73) Assignee: Ideon Technologies Inc., Richmond (CA)

( * ) Notice: Subject to any disclaimer, the term of this patent is extended or adjusted under 35 U.S.C. 154(b) by 0 days.

(21) Appl. No.: 18/346,688

(22) Filed: Jul. 3, 2023

(65) Prior Publication Data
US 2024/0004102 A1  Jan. 4, 2024

Related U.S. Application Data

(63) Continuation of application No. 16/975,499, filed as application No. PCT/CA2020/000036 on Mar. 20, 2020, now Pat. No. 12,007,527.

(Continued)

(51) Int. Cl.
*G01T 1/20* (2006.01)
*G01V 5/04* (2006.01)
(Continued)

(52) U.S. Cl.
CPC ............. *G01V 5/226* (2024.01); *G01T 1/20* (2013.01); *G01V 5/04* (2013.01); *H01J 47/008* (2013.01)

(58) Field of Classification Search
CPC .. G01V 5/226; G01V 5/04; G01T 1/20; G01T 1/18; G01T 5/00; H01J 47/008
See application file for complete search history.

(56) References Cited

U.S. PATENT DOCUMENTS 3,656,019 A  4/1972  Stowe
4,504,438 A  3/1985  Levy et al.
(Continued)

FOREIGN PATENT DOCUMENTS

JP  2015075334 A  4/2015
WO  2009002602 A2  12/2008
(Continued)

OTHER PUBLICATIONS

Menichelli et al., "A scintillating fibres tracker detector for archaeological applications", Nuclear Instruments & Methods in Physics Research. Section A, Elsevier BV * North-Holland, NL, vol. 572, No. 1, Feb. 15, 2007, pp. 262-265, XP005890366.
(Continued)

*Primary Examiner* — Kiho Kim
(74) *Attorney, Agent, or Firm* — Todd A. Rattray; Oyen Wiggs Green & Mutala LLP

(57) ABSTRACT

A borehole muon detector for muon radiography or geotomography is provided, the borehole muon detector including a substantially cylindrical housing, which defines a bore, a pair of end caps, each end cap sealing an end of the cylindrical housing and a plurality of sealed drift tubes which are longitudinally disposed in the bore of the housing to form a bundle of drift tubes, wherein each sealed drift tube comprises: a centrally located anode wire disposed on a longitudinal axis; an inner surface which is coated with a cathode coating, the cathode coating divided into a first cathode pad and a second cathode pad by a Vernier pattern; and a timer in electrical communication with the anode wire for measuring a drift time. A system and a method are also provided.

20 Claims, 7 Drawing Sheets

Related U.S. Application Data

(60) Provisional application No. 62/821,448, filed on Mar. 21, 2019.

(51) Int. Cl.
    *G01V 5/226*     (2024.01)
    *H01J 47/00*     (2006.01)

(56) References Cited

U.S. PATENT DOCUMENTS

| | | |
|---|---|---|
| 6,909,098 B2 | 6/2005 | Bross et al. |
| 7,488,934 B2 | 2/2009 | Bryman |
| 7,531,791 B2 | 5/2009 | Bryman |
| 7,863,571 B2 | 1/2011 | Beken |
| 8,288,721 B2 | 10/2012 | Morris et al. |
| 8,384,017 B2 | 2/2013 | Botto |
| 8,881,808 B2 | 11/2014 | Dorffer et al. |
| 9,482,763 B2 | 11/2016 | Vasilyev et al. |
| 9,841,511 B2 | 12/2017 | Saenger |
| 9,851,311 B2 | 12/2017 | Sossong et al. |
| 10,191,180 B2 | 1/2019 | Yaish et al. |
| 10,451,745 B1 | 10/2019 | Bonal et al. |
| 10,585,208 B1 | 3/2020 | Yaish et al. |
| 10,598,799 B1 | 3/2020 | Berlin |
| 2008/0128604 A1 | 6/2008 | Bryman |
| 2008/0228418 A1* | 9/2008 | Green .................... G01V 5/222 702/81 |
| 2010/0270462 A1 | 10/2010 | Nelson et al. |
| 2011/0035151 A1 | 2/2011 | Botto |
| 2014/0319365 A1 | 10/2014 | Sossong et al. |
| 2020/0018863 A1 | 1/2020 | Bonal et al. |

FOREIGN PATENT DOCUMENTS

| | | |
|---|---|---|
| WO | 2011041750 A1 | 4/2011 |
| WO | 2013155075 A1 | 10/2013 |
| WO | 2016145105 | 9/2016 |
| WO | 2020237369 A1 | 12/2020 |
| WO | 2021046602 A1 | 3/2021 |
| WO | 2021102399 A1 | 5/2021 |
| WO | 2021237288 A1 | 12/2021 |

OTHER PUBLICATIONS

Eric T Wright, "A detector for muon tomography: Data acquisition and preliminary results", May 1, 2007, XP055289981.

International Search Report for PCT/CA2020/050454—Muon Tomography System, Apparatus, and Method for Tunnel Detection.

Written Opinion for PCT/CA2020/050454—Muon Tomography System, Apparatus, and Method for Tunnel Detection.

Harel et al., "Lingacom muography". Philos Trans A Math Phys Eng Sci., Jan. 28, 2019 (Jan. 28, 2019), vol. 377 (2137), pp. 1-7.

Hildebrandt M: "The low-mass drift chamber system of the MEG experiment", Nuclear Science Symposium and Medical Imaging Conference (NSS/MIC), 2011 IEEE, IEEE, Oct. 23, 2011 (Oct. 23, 2011), pp. 1757-1760, XP032121939, ISSN: 1082-3654, DOI: 10.1109/NSSMIC.2011.6154677 ISBN: 978-1-4673-0118-3.

Lorenzo Bonechi et al.: "Atmospheric muons as an imaging tool", arxiv.org, Cornell University Library, 201 Olin Library Cornell University Ithaca, NY 14853, Jun. 10, 2019 (Jun. 10, 2019), XP081375254.

M. Basset et al., "MGR: An innovative, low-cost and compact cosmic-ray detector", Nuclear Instruments and Methods in Physics Research A 567 (2006) 298-301.

R. Schwitters et al., "A Detector for Muon Tomography" (Jun. 2004).

C. Hui, "Maya Muon Tomography Muon Tracking, and Muon Simulation", The University of Texas at Austin (Aug. 2007).

R. C. Ruchti. "The Use of Scintillating Fibers for Charged-Particle Tracking", Annu. Rev. Nucl. Part. Sci. 1996. 46:281- 319 (1996).

The UT Maya Muon Project "Proposal to Build a Prototype Detector for Underground Cosmic Ray Muons" (Jan. 2004).

K. Nagamine et al, "Method of probing inner-structure of geophysical substance with the horizontal cosmic-ray muons and possible application to volcanic eruption prediction", Nuclear Instruments and Methods in Physics Research A 3.56 (1995) 585-595.

International Search Report for PCT/CA2020/000036—Drift Tube Borehole Muon Detector System, Apparatus, and Method for Muon Radiography and Tomography.

Written Opinion for PCT/CA2020/000036—Drift Tube Borehole Muon Detector System, Apparatus, and Method for Muon Radiography and Tomography.

\* cited by examiner

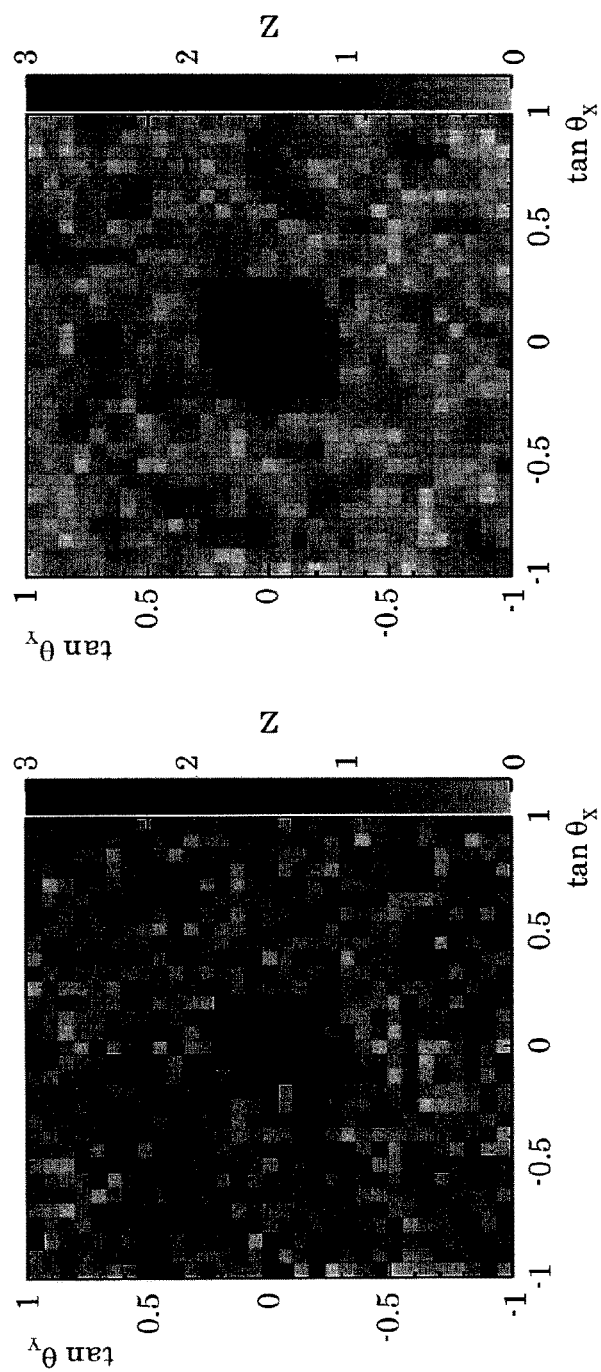
FIG. 8A
FIG. 8B
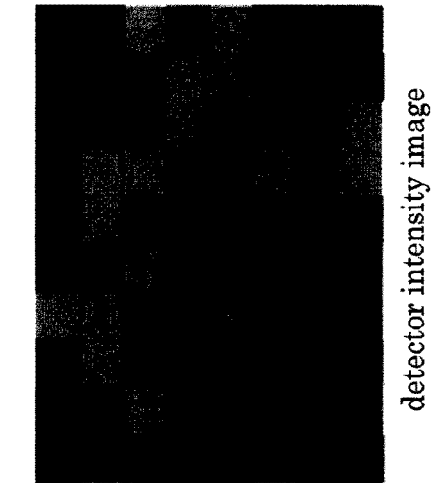
FIG. 8C
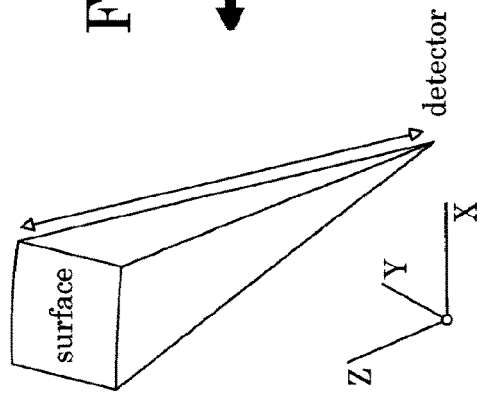
FIG. 8D

DRIFT TUBE BOREHOLE MUON DETECTOR SYSTEM, APPARATUS, AND METHOD FOR MUON RADIOGRAPHY AND TOMOGRAPHY

REFERENCE TO RELATED APPLICATIONS

This application is a continuation of U.S. application Ser. No. 16/975,499 having a filing (371) date of 25 Aug. 2020, which is in turn a 371 national phase application corresponding to Patent Cooperation Treaty (PCT) application No. PCT/CA2020/000036 having an international filing date of 20 Mar. 2020, which is turn claims priority to and the benefit under 35 USC 119 in relation to U.S. application Ser. No. 62/821,448 filed 21 Mar. 2019. All of the applications referred to in this paragraph are hereby incorporated herein by reference.

FIELD

The present technology relates generally to a system, apparatus, and method for tracking cosmic ray muons through an underground sensor in order to develop an image of subsurface density above the sensor (muon radiography), and to use multiple sensors to build a 3D model of density (muon tomography).

BACKGROUND

Exploitation of underground resources (e.g., mineral deposits, oil reservoirs) employs varied geophysical methods to detect, image, and monitor underground regions of interest. One such method is based on a technique known as muon radiography. Muons are elementary particles produced in high energy nuclear interactions that are initiated by cosmic rays in the upper atmosphere. The muons travel at nearly the speed of light and, depending on their energy, can penetrate deep into the earth. The rate at which the muons lose energy in matter is dependent on the properties of the medium, and in particular on the density of matter.

If the rate of muons at all energies and angles at the surface of the earth is known, it can be used to predict the rate of muons passing through a sensor underground, assuming an underlying geological model. This relationship can be inverted to develop a geological model based on the observed rate of muons underground. Muon sensors record the trajectory of muons that pass through them. Over a period of exposure time, the rate of muons passing from any given direction can be measured. From this observed rate, one can infer the average density along a ray path from the sensor towards the surface.

Thus, from a single muon sensor, a map, or image, of average subsurface density above the sensor can be ascertained.

The resolution of the density map is determined by the angular resolution of the muon sensor and by the lateral scattering of muons as they pass through matter. The lateral scattering of muons through fifty meters of rock is about twenty-five milliradians, on average. The average scattering angle decreases with increasing depth because the mean energy of muons that survive increases, and high energy muons are deflected less than low energy ones.

Density maps from multiple sensor locations (either using the same sensor exposed to muon flux in multiple locations, or else from multiple sensors) can be combined to construct a 3D model of the underground density distribution. This is known as muon tomography. This process is achieved by applying inversion algorithms to the set of sensor images, and proceeds analogously to computed tomography for X-ray scanners. The more varied locations from which muon rates can be measured, the more strongly a corresponding 3D density model of the subsurface above the sensors can be constrained.

Anomalies in the subsurface density distribution are often indicative of valuable resources such as dense mineral deposits (e.g., volcanogenic massive sulfide deposits, uranium deposits), oil reservoirs, or other geological markers commonly associated with such resources (e.g., faults). Such anomalies can be identified either in the sensor images (radiography), or with improved spatial information in the 3D distributions (tomography). Identification of density anomalies is also relevant to geotechnical applications such as infrastructure monitoring.

United States Patent Application Publication No. 20200018863 discloses a muon detector system capable of determining muon direction and flight trajectory or path is disclosed. The muon detector system includes scintillators for determining muon direction, and an array of muon detectors arranged in orthogonal layers of drift tubes for determining flight trajectory. The system can be used for tomographic and telescopic mode imaging and may be used for imaging concealed and/or subterranean objects. It is not, however, suitable for borehole applications.

United States Patent Application Publication No. 20140319365 discloses methods, systems, and devices are disclosed for inspecting materials in a vehicle or object. In one aspect, a system for muon tomography detection includes a first and second housing structure each including a first array and second array of muon detection sensors, respectively, the first housing structure positioned opposite the second at a fixed height to form a detection region to contain a target object, in which the muon detection sensors measure positions and directions of muons passing through the first array to the detection region and passing from the detection region through the second array; support structures to position the first housing structure at the fixed height; and a processing unit to receive data from the muon detection sensors and analyze scattering behaviors of the muons in materials of the target object to obtain a tomographic profile or spatial distribution of scattering centers within the detection region. In one exemplary embodiment, each of the upper and lower detection units includes three sets of horizontally X direction-oriented detector arrays alternatively vertically interspersed with three sets of horizontally Y direction oriented arrays, with the X and Y directions being perpendicular to each other. The size and shape of the system precludes it from being useful for borehole applications. It is also not applicable for anything larger than a few meters thick because (a) the system would need to be unmanageably large and (b) the solid angle coverage gets smaller and smaller as the separation between the trackers increases.

United States Patent Application Publication No. 20080128604 discloses a system and method configured for detecting cosmic ray muon (CRM) flux along a variety of trajectories through a subterranean test region, collecting the muon detection data, and processing the data to form a three-dimensional density distribution image corresponding to the test region. In at least one embodiment, the system may be used for identifying concentrations of higher (or lower) density mineral deposits or other geological structures or formations well below the earth's (or ocean floor) surface. The system may be utilized for imaging geological materials and structures of higher and/or lower density in a test region having a depth of several kilometers or more. The time projection chamber has a restricted length because of the requirement that the ionization trail drift needs to be precisely controlled, and this is very difficult for a long cylinder.

WIPO Publication No. WO/2009/002602 discloses techniques, apparatus and systems for detecting particles such as muons for imaging applications. Subtraction techniques are described to enhance the processing of the muon tomography data. Each set of position sensitive detectors comprises a first double-layer 220 of drift tubes 204 arranged in the X direction and a second double-layer 221 of drift tubes 204 arranged in the Y direction. The size and shape of the system precludes it from being useful for borehole applications. Orthogonal planar layers cannot be used in a borehole system because the transverse dimension is limited to be less than 10 cm in a borehole system.

What is needed is a muon detector that is suitable for borehole applications. It would be preferable if it had a bundle of drift tubes. It would be further preferable if the borehole muon detector did not require orthogonally disposed drift tubes and instead, had a Vernier pattern on the cathode of each drift tube to allow precise determination of the longitudinal coordinate of a muon. It would be further preferable if it included longitudinally disposed scintillators to provide a reference time of when a muon impinged upon the detector. It would be preferable if the borehole muon detector was tubular. It would be preferable if it was a sealed unit that could withstand high pressure and would be waterproof. It would be most preferable if it could measure the trajectory of muons in three dimensions.

SUMMARY

The present technology is a borehole muon detector. It has drift tubes that are longitudinally disposed and in a bundle. Each drift tube includes a Vernier pattern on the cathode to allow precise determination of the longitudinal coordinate of a muon. The borehole muon detector includes longitudinally disposed scintillators on an outer surface of the bundle of drift tubes to provide a reference time of when a muon impinged upon the detector. The borehole detector is tubular and is a sealed unit that can withstand high pressure. It is waterproof and dustproof. The borehole muon detector can measure the trajectory of a muon in three dimensions.

In one embodiment borehole muon detector for muon radiography or geotomography is provided, the borehole muon detector including a substantially cylindrical housing, which defines a bore, a pair of end caps, each end cap sealing an end of the cylindrical housing and a plurality of sealed drift tubes which are longitudinally disposed in the bore of the housing to form a bundle of drift tubes, wherein each sealed drift tube comprises: a centrally located anode wire disposed on a longitudinal axis; an inner surface which is coated with a cathode coating, the cathode coating divided into at least a first cathode pad and a second cathode pad by a Vernier pattern; and a printed circuit board in electrical communication with the anode wire for measuring a current.

In the borehole muon detector, there may be at least three drift tubes in the bundle.

The borehole muon detector may further include a plurality of scintillator members disposed on the bundle.

The borehole muon detector may further include at least one position sensor.

In the borehole muon detector, the position sensor may be one or more of an accelerometer, a magnetometer and a gyroscope.

In another embodiment, a system for borehole muon geotomography is provided, the system including at least one borehole muon detector for placement in at least one boreholes and a processor in electronic communication with each of the borehole muon detectors, each borehole muon detector including a substantially cylindrical housing, which defines a bore, a pair of end caps, each end cap sealing an end of the cylindrical housing and a plurality of sealed drift tubes which are longitudinally disposed in the bore of the housing to form a bundle of drift tubes, wherein each sealed drift tube comprises: a centrally located anode wire disposed on a longitudinal axis; an inner surface which is coated with a cathode coating; and printed circuit board in electrical communication with the anode wire and in electronic communication with the processor.

The system may further comprise a plurality of scintillator members disposed on at least one bundle.

In the system, each borehole muon detector may further include at least one position sensor.

In the system, the position sensor may be one or more of an accelerometer, a magnetometer and a gyroscope.

In the system, the cathode coating may be divided into at least a first cathode pad and a second cathode pad by a Vernier pattern.

In another embodiment, a method for borehole muon radiography or geotomography is provided, the method comprising: positioning a plurality of borehole muon detectors in one or more boreholes, each borehole muon detector including a plurality of sealed drift tubes, each drift tube including a centrally located anode wire disposed on a longitudinal axis, an inner surface which is coated with a cathode coating and timer; generating a radial electric field between the anode wire and the cathode coating; and measuring a plurality of muon trajectories.

In the method, the plurality of muon trajectories may be processed to provide a two-dimensional image.

In the method, the plurality of muon trajectories may be processed to provide a plurality of two-dimensional images.

In the method, the plurality of two-dimensional images may be further processed by applying inversion algorithms to provide at least one three dimensional image.

FIGURES

FIGS. 8A and 8B shows sensor images for a simulated cuboid, 100 meters above a muon sensor situated underground. FIG. 8A shows the image with a sliding window filtering algorithm; FIG. 8B shows with image without the sliding window filtering algorithm; and FIGS. 8C and 8D show that each pixel represents a region of solid angle.

Figure 1:
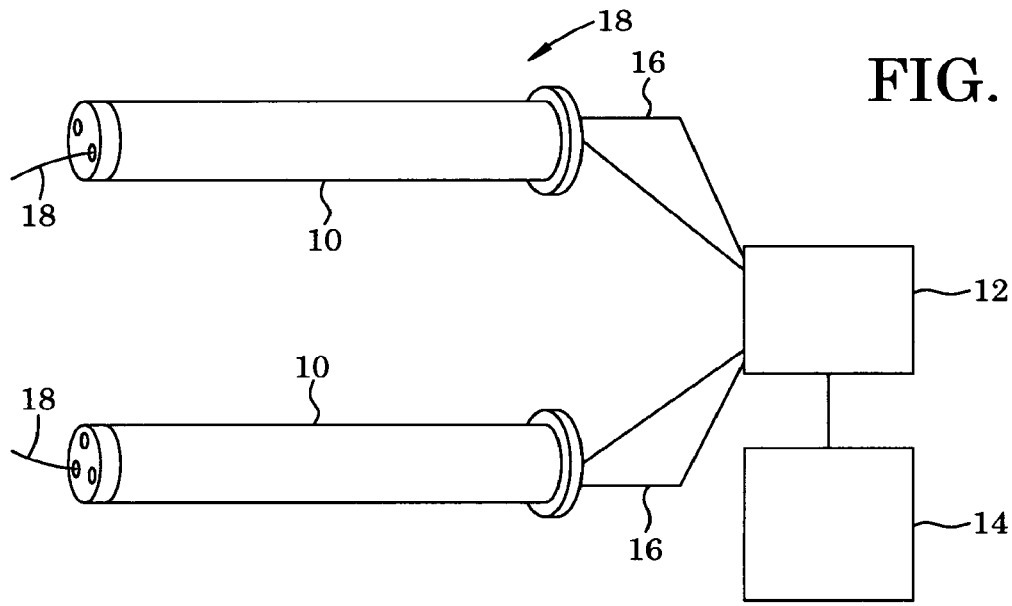
FIG. 1 is a schematic of a borehole muon detector system of the present technology.
Figure 9:
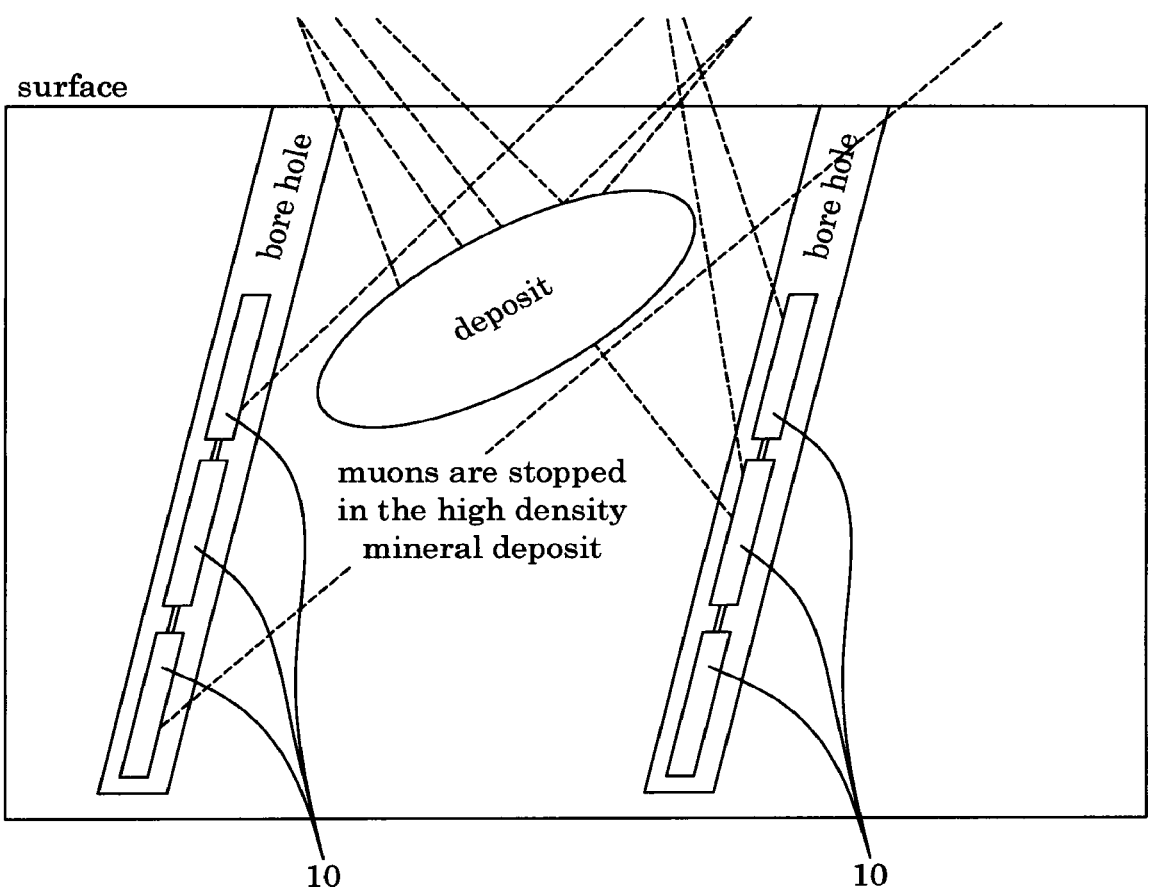

FIG. 9 shows an array of boreholes with borehole muon detectors installed and the detection of a density anomaly using an array of borehole muon detectors in the borehole muon detector system of FIG. 1.

DESCRIPTION

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof1, "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

A borehole muon detector system, generally referred to as 8 is shown in FIG. 1. It includes one or more borehole muon detectors 10, a computer processing unit 12 and a user interface 14. Support cables 16 and electrical connections 18 extend from the borehole muon detector 10 to the computer processing unit 12. The borehole muon detector system 8 can be used in resource exploration and monitoring, and in security applications. The system measures the trajectory of muons that pass through it, from which a differential intensity measurement (radiographic image) can be derived. The differential intensity measurements from multiple borehole muon detection systems 8 can be inverted to estimate the three-dimensional distribution of subsurface density (tomographic analysis).

Figure 2A:
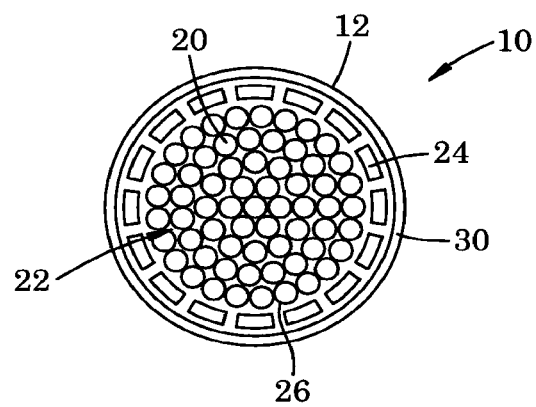
FIG. 2A is a cross sectional view of a borehole muon detector of the system of FIG. 1.
Figure 2B:
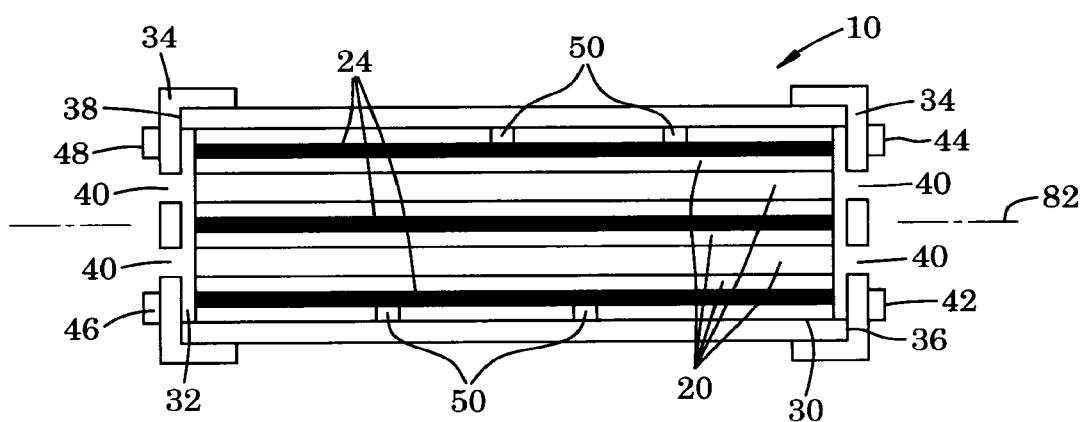
FIG. 2B is a longitudinal sectional view of a borehole muon detector of the system of FIG. 1.

As shown in FIG. 2A, each borehole muon detector 10 includes drift tubes 20 which are arranged in a bundle, generally referred to as 22, with a plurality of scintillator members 24 around the periphery 26 of the bundle 22. The drift tubes 20 and the scintillator members 24 are encased in a housing 30, which is tubular. As shown in FIG. 2B, the drift tubes 20 and the scintillator members 24 are longitudinally disposed in the bore 32 of the housing 30 and lie overtop the drift tube bundle 22. It can be seen that they are segmented from one another. There are no orthogonally disposed drift tubes 20. The housing 30 has an endcap 34 at each end 36, 38. The endcaps 34 include apertures 40 for the electrical connections 16 and support cables 18. At one end 36 of the housing 30 there is a power input 42 and data output connector 44. The data output connector 44 consists of a ruggedized Ethernet or coaxial connector. The power input 42 is a suitable ruggedized DC electrical connector. At the other end 38 the housing 30 there is a power output 46 and data input connector 48. The data input connector 48 consists of a ruggedized Ethernet or coaxial connector. The power output 46 is a suitable ruggedized DC electrical connector. A support matrix 50 locates and retains the drift tubes 20.

Figure 3:
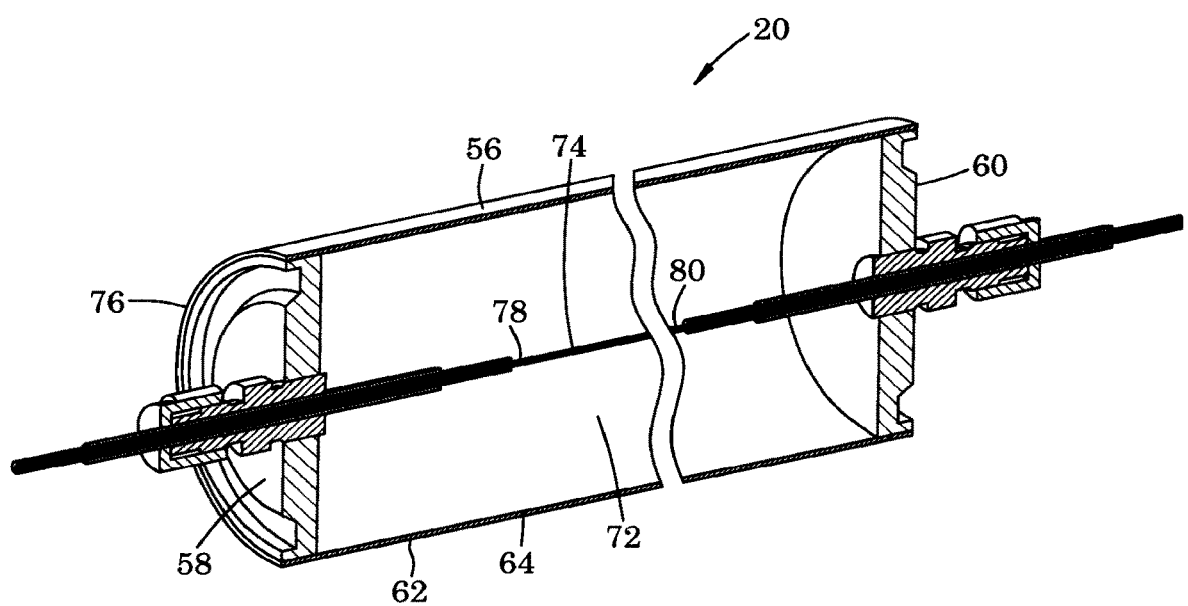
FIG. 3 is a perspective longitudinal view of a drift tube of the borehole muon detector of FIGS. 2A and 2B.

As shown in FIG. 3, each drift tube 20 includes a tubular wall 56 of rigid material such as plastic, aluminum or carbon fiber, or a Mylar® film that is appropriately glued or supported to maintain rigidity. The drift tube 20 has a first end 58 and a second end 60. Each cylindrical drift tube 20 is a few centimeters in diameter and many centimeters (up to a few meters) in length. The inner surface 62 of each drift tube wall 56 has an electrically conductive surface coating 64, which is a cathode.

The tubular wall 56 defines a bore 72. The bore 72 is filled with an ionizing gas mixture such as argon/carbon dioxide or other appropriate mixture. Centrally located in the bore 72 is an anode wire 74. The central anode wire 74 is an appropriate tungsten/gold/steel wire, affixed in place by plugs 76 at both ends of the tubular wall 60, and maintained at a high potential of a few thousand volts with respect to the cathode coating 64. The anode wire 74 has a first end 78 and a second end 80. It is disposed on the longitudinal axis 82. The drift tube 20 is sealed.

Figure 4:
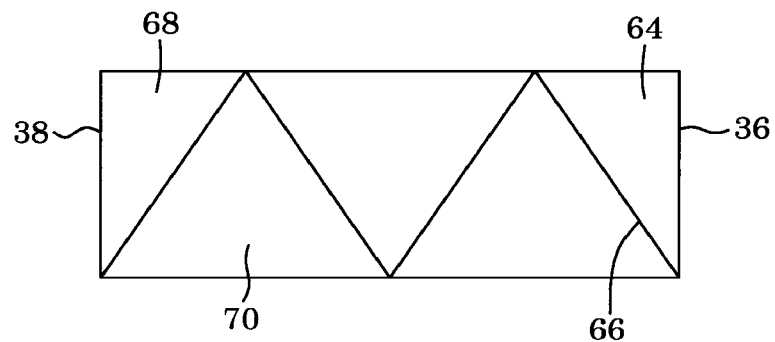
FIG. 4 shows an exemplary "Vernier pattern" cathode system on the inner wall of a drift tube.

As shown in FIG. 4, the cathode coating 64 is divided into two separate parts, forming a "Vernier" pattern 66 which extends from the first end 36 to the second end 38, to provide a first cathode pad 68 and a second cathode pad 70. There may be more than two cathode pads 68, 70.

Figure 5:
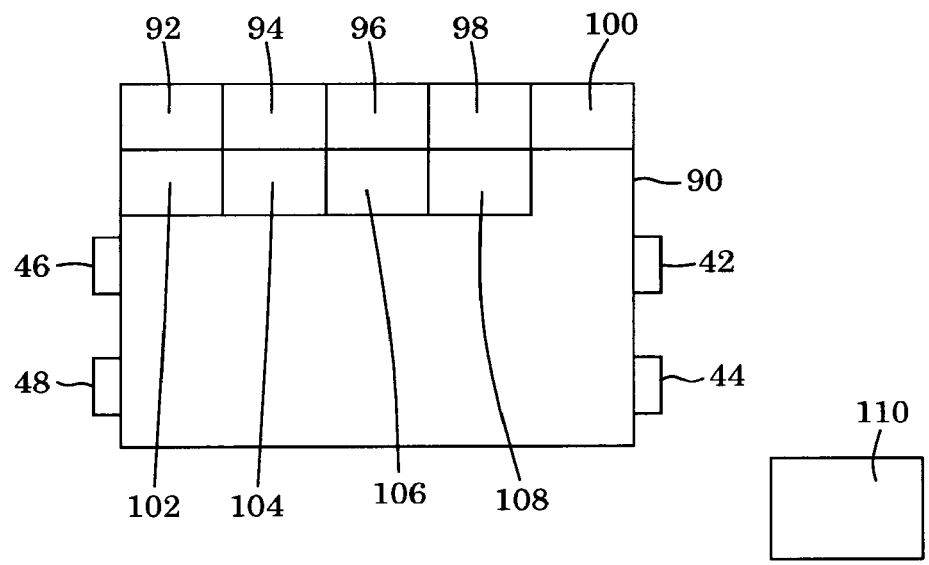
FIG. 5 is a schematic of the electronics of the borehole muon detector of FIGS. 2A and 2B.

As shown in FIG. 5, each borehole muon detector 8 includes a printed circuit board (PCB) 90. The power input 42, data output connector 44, the power output 46 and the data input connector 48 are in electrical and electronic communication with the PCB 90.

The PCB 90 consists of preamplifiers 92, a high voltage generator 94 to supply potential to the drift tube anode wires 74, application specific integrated circuits (ASICs) 96, analog to digital converters (ADCs) 98 for measuring the voltage on the cathode pads 68, 70 of each drift tube 20, the current on the anode wires 74, and time to digital converters (TDCs) 100 for measuring the time of a pulses. Alternatively,"charge division" can be used with a resistive anode wire 74 instead of relative timing on the anode wires 74. The TDCs 100 determine both the drift time of the ionization and the relative timing along the anode wire 74 of the pulse arrival at each end 36, 38 of the drift tube 20. The latter is used to determine which of the repeated Vernier segments (a pair of cathode pads 68, 70) is aligned with the ionization event. The PCB 90 also includes a field programmable gate array (FPGA) 102, an accelerometer 104, a magnetometer 106, and a gyroscope 108. The TDCs 100 and ADCs 96 are connected to field programmable gate arrays (FPGAs) which process the data from all drift tubes 20 to identify coincidences consistent with the passage of a muon, and export this data to an online backend computer 18 for further processing, storage, and pipelining to a surface data collector 1 10. Additional electronics for monitoring temperature, gas pressure, and other slow controls are embedded within the system.

Figure 6A:
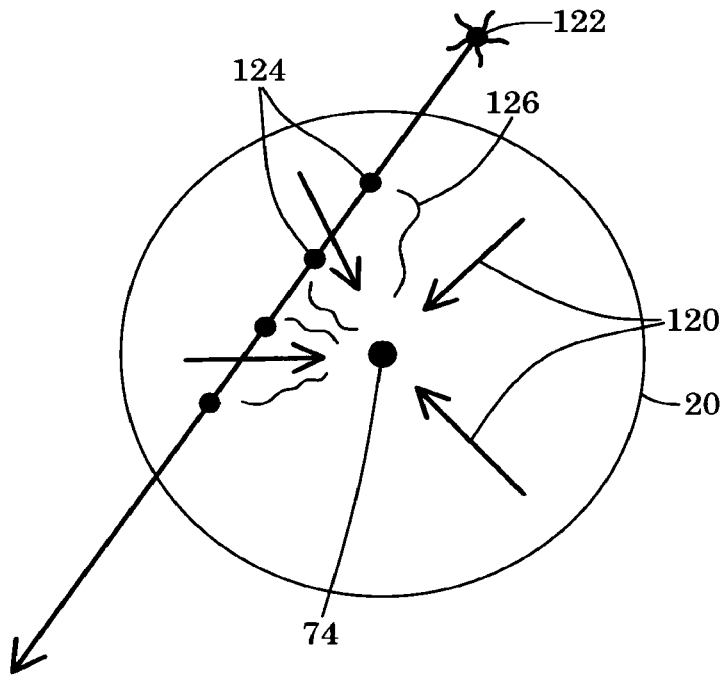
FIG. 6A is a cross sectional view showing how a muon is tracked through a single drift tube of the borehole muon detector of FIGS. 2A and 2B.

As shown in FIG. 6A, the electric field 120 is perpendicular to the longitudinal axis 82 and therefore the anode wire 72, as it traverses the bore 72 from the cathode coating 64 to the anode wire 72. The muons 122 create ionization 124 that drifts towards the anode wire 72 on drift paths 126. The radial position within the drift tube 20 (how close the muon passes by the anode wire 74) is determined by the time it takes for the closest electrons to drift to the anode wire 74. By measuring the difference in time or current between the current pulses measured on each end 78, 80 of the anode wire 74, a rough estimate of the position along the anode wire 74 where the muon passed by is achievable. Each drift tube 20 measures position along the anode wire 74 (Z measurement), and a drift time relative to a reference clock (may be provided by a scintillator pulse from the scintillator members 24).

Figure 6B:
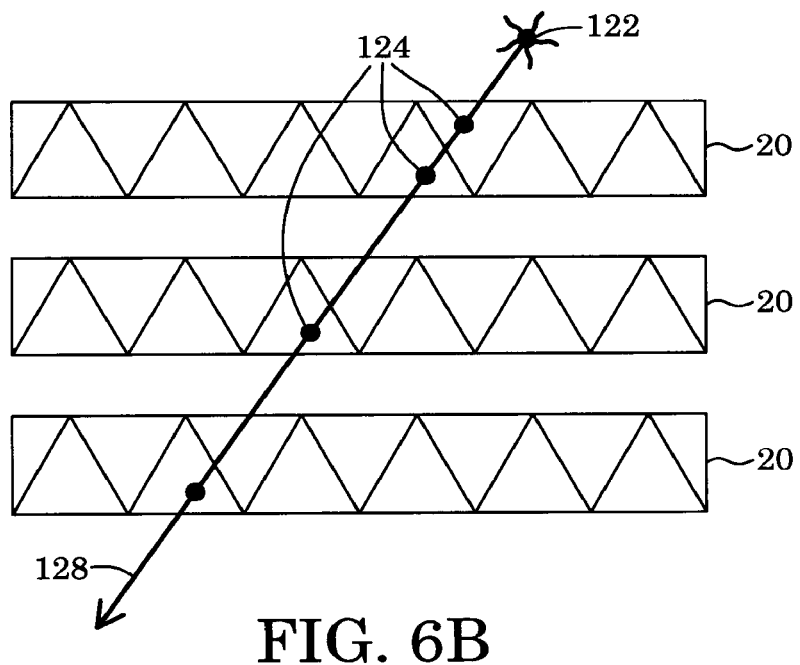
FIG. 6B is a longitudinal view showing how a muon is tracked through a number of drift tubes of the borehole muon detector of FIGS. 2A and 2B.

As shown in FIG. 6B, the Vernier pattern 66 of the cathode coating 64 then allows for a much finer measurement of longitudinal position. Within a single Vernier pattern the fractional mirror charge measured on the respective cathodes is linearly related to longitudinal position. If a muon 122 passes through at least three drift tubes 20 within the housing 30, the azimuthal angle of the muon trajectory can be accurately determined from the radial measurements. The zenith angle of the muon trajectory 128 with respect to the longitudinal axis 82 of the borehole muon detector 10 is determined from regression on the longitudinal positions measured in each of the drift tubes 20. Thus, a borehole muon detector 10 comprised of an array of drift tubes 20 instrumented with a Vernier pattern 66 on the cathode coating 64 of the drift tubes 20, allows for precise determination of muons 122 that pass through the borehole muon detector 10. Difference in drift times between multiple drift tubes 20 in a bundle 22 provides X-Y measurements and with X-Y-Z measurements from multiple drift tubes 20, the full trajectory can be reconstructed.

Figure 7A:
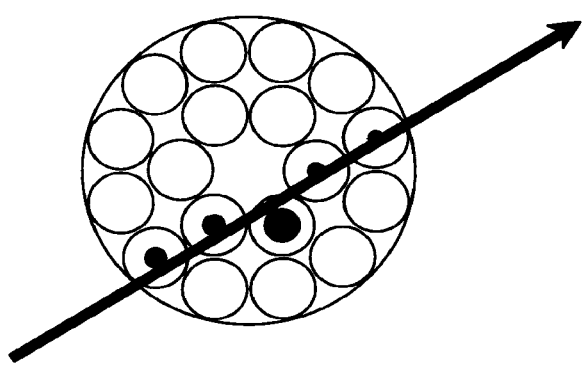
FIG. 7A is a cross sectional view showing how a muon is tracked through the borehole muon detector of FIGS. 2A and 2B.
Figure 7B:
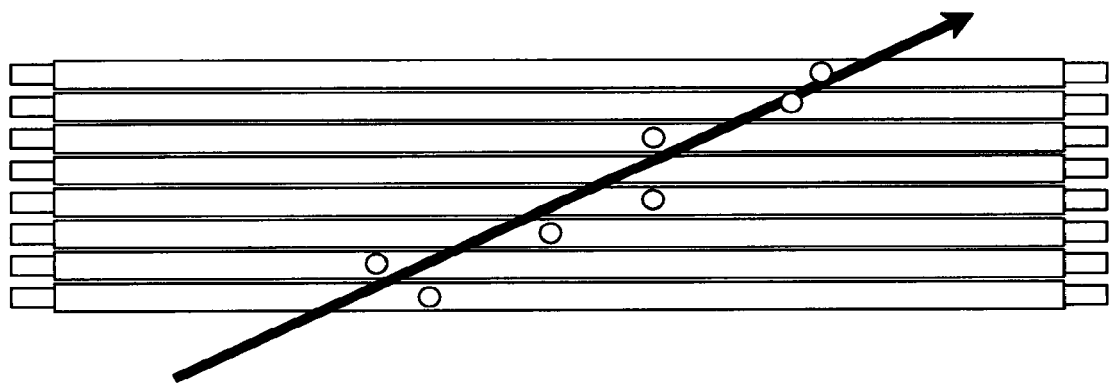
FIG. 7B is a longitudinal view showing how a muon is tracked through the borehole muon detector of FIGS. 2A and 2B.

FIG. 7A shows how a muon is tracked through the borehole muon detector 10 in the transverse plane. A line is fit through all the drift tubes 20 in which a pulse is observed, using the isochrones (white circles) to perform a best fit. FIG. 7B shows how a muon is tracked through the borehole muon detector 10 in the longitudinal plane. A line is fit using the longitudinal position estimates (white points) coming from time differences between first end 58 and second end 60 measurements of each drift tube 20 and from the voltage division among the "Vernier pattern" cathodes 64.

FIGS. 8A and 8B show two dimensional radiographic images of muon intensity underneath a simulated 50 m×50 m×20 m cuboid (1 g/cc contrast), 100 meters above a borehole muon detector that is situated 400 meters underground. The image is shown with (FIG. 8A) and without (FIG. 8B) a sliding window filtering algorithm applied. Each pixel represents a region of solid angle as shown in FIGS. 8C and 8D. The muon intensity shadow shows the location of a density anomaly above the borehole muon detector 10. Three dimensional images can be obtained from the two dimensional images by applying inversion algorithms to a set or plurality of two dimensional images.

FIG. 9 is a schematic of a borehole muon detector system 8 with multiple borehole muon detectors 10 arranged in series in each of two boreholes.

In an embodiment, the borehole muon detector system 8 or the borehole muon detector 10 may determine an occupancy or muon intensity map (radiographic image) of a projected surface above the borehole muon detector system 8 or the borehole muon detector 10 using the muon trajectory for muons that pass through the borehole muon detector system 8 or the borehole muon detector 10. The muon intensity in each section of solid angle emanating from the borehole muon detector system 8 or the borehole muon detector 10 to the surface is a measure of the average density of the earth within that volume. Regions of lower or higher density will have correspondingly higher or lower muon occupancy within the corresponding pixels of the radiographic images. The radiographic images from the borehole muon detector system 8 may facilitate tomographic analysis in order to estimate the three-dimensional distribution of subsurface density above the borehole systems.

The invention comprises a number of non-limiting aspects. Non-limiting aspects of the invention provide:

1. A borehole muon detector for muon radiography or geotomography, the borehole muon detector including a substantially cylindrical housing, which defines a bore, a pair of end caps, each end cap sealing an end of the cylindrical housing and a plurality of sealed drift tubes which are longitudinally disposed in the bore of the housing to form a bundle of drift tubes, wherein each sealed drift tube comprises: a centrally located anode wire disposed on a longitudinal axis; an inner surface which is coated with a cathode coating, the cathode coating divided into at least first cathode pad and a second cathode pad by a Vernier pattern; and a printed circuit board in electrical communication with the anode wire for measuring a current.
2. The borehole muon detector of aspect 1, wherein there are at least three drift tubes in the bundle.
3. The borehole muon detector of aspect 2, further including a plurality of scintillator members disposed on the bundle.
4. The borehole muon detector of aspect 2 or 3, further including at least one position sensor.
5. The borehole muon detector of aspect 4, wherein the position sensor is one or more of an accelerometer, a magnetometer and a gyroscope.
6. A system for borehole muon geotomography, the system including at least one borehole muon detector for placement in at least one boreholes and a processor in electronic communication with each of the borehole muon detectors, each borehole muon detector including a substantially cylindrical housing, which defines a bore, a pair of end caps, each end cap sealing an end of the cylindrical housing and a plurality of sealed drift tubes which are longitudinally disposed in the bore of the housing to form a bundle of drift tubes, wherein each sealed drift tube comprises: a centrally located anode wire disposed on a longitudinal axis; an inner surface which is coated with a cathode coating; and printed circuit board in electrical communication with the anode wire and in electronic communication with the processor.

7. The system of aspect 6, further comprising a plurality of scintillator members disposed on at least one bundle.
8. The system of aspect 6 or 7, wherein each borehole muon detector further includes at least one position sensor.
9. The system of aspect 8, wherein the position sensor is one or more of an accelerometer, a magnetometer and a gyroscope.
10. The system of any one of aspects 6 to 9, wherein the cathode coating is divided into at least a first cathode pad and a second cathode pad by a Vernier pattern.
11. A method for borehole muon radiography or geotomography, the method comprising: positioning a plurality of borehole muon detectors in one or more boreholes, each borehole muon detector including a plurality of sealed drift tubes, each drift tube including a centrally located anode wire disposed on a longitudinal axis, an inner surface which is coated with a cathode coating and timer; generating a radial electric field between the anode wire and the cathode coating; and measuring a plurality of muon trajectories.
12. The method of aspect 11, wherein the plurality of muon trajectories are processed to provide a two dimensional image.
13. The method of aspect 11, wherein the plurality of muon trajectories are processed to provide a plurality of two dimensional images.
14. The method of aspect 13, wherein the plurality of two-dimensional images are further processed by applying inversion algorithms to provide at least one three dimensional image.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A muon detector for use in a borehole, the muon detector comprising:
   a tubular housing which defines a bore that is elongated along a longitudinal axis;
   a plurality of elongated drift tubes disposed in the bore of the housing to form a bundle of drift tubes, each drift tube elongated in a direction parallel to the longitudinal axis and the bundle of drift tubes being arranged to be discretely circularly symmetric about the longitudinal axis, each drift tube comprises a centrally located anode wire disposed on a longitudinal axis of the drift tube and a bore-defining cathode surface; and
   data-acquisition electronics connected to receive electronic signals from each of the plurality of drift tubes and configured to determine trajectories of muons traversing the muon detector based on at least one of the signals received from the drift tubes.
2. The muon detector of claim 1 wherein the data-acquisition electronics are configured to determine an azimuthal angle about the longitudinal axis of a muon traversing the muon detector based on drift times of multiple drift tubes in the bundle.
3. The muon detector of claim 2 wherein the data-acquisition electronics are configured to determine the azimuthal angle about the longitudinal axis of the muon traversing the muon detector by: determining, for each of the multiple drift tubes, an isochrone comprising a radial distance of the muon from the anode wire; and, fitting a line through the isochrones of at least three drift tubes from among the multiple drift tubes to thereby determine the azimuthal angle.
4. The muon detector of claim 1 wherein the data acquisition electronics are configured to determine a zenith angle relative to the longitudinal axis of a muon traversing the muon detector based on longitudinal position estimates from a sub-plurality of drift tubes in the bundle.
5. The muon detector of claim 4 wherein the data-acquisition electronics are configured to determine the zenith angle relative to the longitudinal axis of the muon traversing the muon detector by fitting a line through the longitudinal position estimates of the sub-plurality of drift tubes.
6. The muon detector of claim 4 wherein the bore-defining cathode surface of each drift tube is divided into a plurality (e.g. 2) of cathode parts to form a Vernier pattern.
7. The muon detector of claim 6 wherein the data acquisition electronics are configured to determine, for each drift tube in the sub-plurality of drift tubes, a coarse longitudinal position estimate of the muon traversing the drift tube based on at least one of: charge division where the anode wire is resistive and relative timing of electrical pulses at longitudinal ends of the cathode parts.
8. The muon detector of claim 7 wherein the coarse longitudinal position estimate has an uncertainty that is less than a spatial period of the Vernier pattern.
9. The muon detector of claim 7 wherein the data acquisition electronics are configured to determine, for each drift tube in the sub-plurality of drift tubes, a precise longitudinal position estimate of the muon traversing the drift tube based on a ratio of the voltages on the plurality of cathode parts.
10. A method for detecting muons in a borehole, the method comprising:
    arranging a plurality of elongated drift tubes in a bundle, each of the plurality of drift tubes elongated in a direction parallel to a longitudinal axis and the bundle of drift tubes discretely circularly symmetric about the longitudinal axis;
    placing a muon detector comprising the plurality of drift tubes into a borehole;
    determining trajectories of muons traversing the muon detector based on signals generated by at least one of the drift tubes.
11. The method of claim 10 comprising determining, for a muon traversing the muon detector, an azimuthal angle about the longitudinal axis of the muon traversing the muon detector based on drift times associated with multiple drift tubes in the bundle.
12. The method of claim 11 wherein determining the azimuthal angle about the longitudinal axis of the muon traversing the at least one muon detector comprises determining, for each of the multiple drift tubes, an isochrone comprising a radial distance of the muon from the anode wire; and, fitting a line through the isochrones of at least three drift tubes from among the multiple drift tubes to thereby determine the azimuthal angle.
13. The method of claim 10 comprising determining, for a muon traversing the muon detector, a zenith angle relative to the longitudinal axis of the muon traversing the muon detector based on longitudinal position estimates from a sub-plurality of drift tubes in the bundle.

14. The method of claim 13 wherein determining the zenith angle relative to the longitudinal axis of the muon traversing the muon detector comprises fitting a line through the longitudinal position estimates of the sub-plurality of drift tubes.

15. The method of claim 13 comprising shaping a bore-defining cathode surface of each drift tube into a plurality (e.g. 2) of cathode parts to form a Vernier pattern.

16. The method of claim 15 comprising determining, for each drift tube in the sub-plurality of drift tubes, a coarse longitudinal position estimate of the muon traversing the drift tube based on at least one of: charge division where an anode wire disposed along a central longitudinal axis of the drift tube is resistive and relative timing of electrical pulses at longitudinal ends of the cathode parts.

17. The method of claim 16 wherein the coarse longitudinal position estimate has an uncertainty that is less than a spatial period of the Vernier pattern.

18. The method of claim 17 comprising determining, for each drift tube in the sub-plurality of drift tubes in the bundle, a precise longitudinal position estimate of the muon traversing the drift tube based on a ratio of the voltages on the plurality of cathode parts.

19. A system for estimating subsurface densities, the system comprising:
   one or more muon detectors located in one or more boreholes, each muon detector comprising:
   a tubular housing which defines a bore that is elongated along a longitudinal axis;
   a plurality of elongated drift tubes disposed in the bore of the housing to form a bundle of drift tubes, each drift tube elongated in a direction parallel to the longitudinal axis and the bundle of drift tubes being arranged to be discretely circularly symmetric about the longitudinal axis, each drift tube comprises a centrally located anode wire disposed on a longitudinal axis of the drift tube and a bore-defining cathode surface; and
   data-acquisition electronics connected to receive electronic signals from each of the plurality of drift tubes and configured to determine trajectories of muons traversing the muon detector based on the signals received from the drift tubes; and,
   a processing unit in communication with each of the one or more muon detectors and configured to generate a three-dimensional density profile of a region of interest based on a plurality of trajectories of muons traversing the one or more muon detectors.

20. The system of claim 19 wherein, for each muon traversing a muon detector of the one or more muon detectors, the data-acquisition electronics are configured to determine an azimuthal angle about the longitudinal axis of the muon traversing the muon detector based on drift times of multiple drift tubes in the bundle.

* * * * *